United States Patent

Smith, Jr.

[15] 3,689,697

[45] Sept. 5, 1972

[54] SYNCHRONIZING SYSTEM

[72] Inventor: James S. Smith, Jr., Lynchburg, Va.

[73] Assignee: General Electric Company,

[22] Filed: March 15, 1971

[21] Appl. No.: 124,192

[52] U.S. Cl. ..........................179/15 BS, 178/69.5 R

[51] Int. Cl. ..............................................H04j 3/06

[58] Field of Search ..179/15 AP, 15 BS; 178/69.5 R; 340/347 DD

[56] References Cited

UNITED STATES PATENTS 3,524,938 8/1970 Boxall ....................179/15 BS

*Primary Examiner*—Ralph D. Blakeslee
*Attorney*—James J. Williams, Frank L. Nauhauser, Oscar B. Waddell and Joseph B. Forman

[57] ABSTRACT

In a time-division multiplex, pulse-code modulation system, each sequence of four binary pulses representing information are converted to a group of three ternary pulses for transmission to a receiver. At the receiver, the same groups of three ternary pulses are converted back to four binary pulses for decoding and demultiplexing. Both conversions are made in accordance with a code in which three ternary zeros do not appear in any correct ternary grouping. If the receiver is out of frame, a condition which can be indicated by framing binary pulses, the receiver sends an alarm to the distant transmitter to cause the distant transmitter to send a special code of ternary pulses having a large number of three zeros in sequence. If, at the receiver, three zeros appear in a ternary pulse group, the grouping is shifted by one ternary pulse. If three zeros subsequently appear in a group, the grouping is again shifted by one ternary pulse. After no more than two such shifts, the grouping will be correct and the proper ternary-to-binary conversion, followed by decoding and demultiplexing, can take place.

17 Claims, 7 Drawing Figures

INVENTOR:
JAMES S. SMITH, JR.
BY James J. Williams
HIS ATTORNEY.

X IS NORMAL 7 BIT INFORMATION CODE OR 1000000 DISTINGUISHING CODE

Y IS 0 FOR IN-FRAME CONDITION AND 1 FOR OUT-OF-FRAME ALARM CONDITION $S_1$–$S_{36}$ ARE SIGNALLING INFORMATION

BITS 253—257 OF FRAMES 10–12 ARE FRAMING SIGNALS

INVENTOR:
JAMES S. SMITH, JR.

BY James J. Williams
HIS ATTORNEY.

FIG. 3

BINARY — TERNARY (4-3) CONVERSION CODE

| BINARY GROUP | TERNARY GROUP | | POLARITY WEIGHT |
|---|---|---|---|
| | POSITIVE MODE | NEGATIVE MODE | |
| 0000 | 0 + 0 | 0 − 0 | 1 |
| 0001 | + 0 0 | − 0 0 | 1 |
| 0010 | + − 0 | + − 0 | 0 |
| 0011 | − + 0 | − + 0 | 0 |
| 0100 | 0 + − | 0 + − | 0 |
| 0101 | + + + | − − − | 3 |
| 0110 | + − + | − + − | 1 |
| 0111 | − 0 + | − 0 + | 0 |
| 1000 | 0 0 + | 0 0 − | 1 |
| 1001 | − + + | + − − | 1 |
| 1010 | + + 0 | − − 0 | 2 |
| 1011 | 0 + + | 0 − − | 2 |
| 1100 | + 0 − | + 0 − | 0 |
| 1101 | + 0 + | − 0 − | 2 |
| 1110 | + + − | − − + | 1 |
| 1111 | 0 − + | 0 − + | 0 |

POSITIVE MODE IS USED IF PRIOR NET POLARITY WEIGHT IS NEGATIVE
NEGATIVE MODE IS USED IF PRIOR NET POLARITY WEIGHT IS ZERO OR POSITIVE

INVENTOR:
JAMES S. SMITH, JR.

BY James J. Williams
HIS ATTORNEY.

INVENTOR:
JAMES S. SMITH, JR.
BY James J. Williams
HIS ATTORNEY.

INVENTOR:
JAMES S. SMITH, JR.
BY James J. Williams
HIS ATTORNEY.

SYNCHRONIZING SYSTEM

CROSS-REFERENCE TO RELATED APPLICATIONS

This application describes an invention which is particularly useful in a time-division multiplex, pulse-code modulation system as described and claimed in a patent application entitled "Communication System Using Time-Division Multiplexing and Pulse-Code Modulation," filed Feb. 1, 1971, Ser. No. 111,436, and assigned to the General Electric Company.

BACKGROUND OF THE INVENTION

My invention relates to an improved synchronizing system for a time-division multiplex, pulse-code modulation system, and particularly to a synchronizing system for grouping ternary pulses for conversion to binary pulses at a receiver so that the grouping and conversion will be in correspondence or agreement with the original conversion of binary pulses to ternary pulses at a distant transmitter.

Communication systems using time-division multiplexing and pulse-code modulation are used to provide a plurality of relatively low-noise, easily regenerated communication channels over a single communication circuit. Such systems are described in considerable detail in a book entitled "Transmission Systems for Communications," by Members of the Technical Staff, Bell Telephone Laboratories, Fourth Edition, 1970. One such system, designated the T–1 System by the Bell Telephone System, is used extensively for local transmission in large cities. The T–1 System provides 24 channels over two pairs of wires, one pair of wires being used for each direction of transmission. While the T–1 System provides good utilization of existing cable pairs, it still does not meet the presently increasing demands for telephone service, particularly in the large cities of the United States. In order to meet these demands, telephone companies are now considering the addition of more cables to provide additional circuits. Such additional cables represent a large financial outlay; and, in some cities, are almost out of the question because of the congestion and limited space available for such cables, and the resultant high construction costs.

In order that more telephone circuits can be provided over the same cable pairs, a new time-division multiplex, pulse-code modulation system has been devised. This newer system is designated the TCS–27 Pulse Code Modulation Carrier System, and is described in the patent application referred to above. The TCS–27 system uses time-division multiplexing and pulse-code modulation of 36 channels for voice, and a separate 37 th channel for signalling, alarms, and framing. Each of the 36 voice channels is amplitude-sampled 8,000 times per second, and the samples are time-division multiplexed. The amplitude of each of the multiplexed samples is then encoded by seven binary pulses. Five binary pulses representing signalling, alarms, and framing are multiplexed after each 252 pulses (36 voice channels times 7 pulses per channel) to complete one frame comprising 257 pulses. Twelve such frames comprise a super frame that represents: 12 amplitude samples of each of the 36 voice channels; one sample of each of the signals for the 36 channels; and also the alarm and framing signals. The binary pulses are applied to a binary-to-ternary converter which converts each sequence of four binary pulses to a group of three ternary pulses at a reduced pulse rate, so as to conserve the line bandwidth requirements. At the receiver, the ternary pulses are converted back to binary pulses for decoding and demultiplexing. Unlike other time-division multiplex, pulse-code modulation systems, such as the T–1 System which uses only binary pulses that can be directly synchronized, the 36-channel TCS–27 requires added synchronization so that each and every group of three ternary pulses (which is converted) corresponds with or contains the same three ternary pulses converted from four binary pulses by the transmitter. In other words, proper grouping of the ternary pulses at the receiver is essential. Otherwise, the information provided after the conversion to binary pulses, the decoding, and the demultiplexing will be unintelligible or useless.

Accordingly, an object of my invention is to provide a new and improved synchronizing system for the ternary pulses of a time-division multiplex, pulse-code modulation system.

A relatively specific object of my invention is to provide a new system for rapidly grouping the received ternary pulses identically with the grouping of the transmitted ternary pulses in a 36-channel, TCS–27 Pulse Code Modulation Carrier System.

Another object of my invention is to provide a new system for grouping received ternary pulses in groups corresponding to the groups of three ternary pulses converted from four binary pulses at a distant transmitter.

SUMMARY OF THE INVENTION

Briefly, these and other objects are achieved in accordance with my invention by utilizing a ternary code in which three ternary zeros do not appear in sequence if the proper grouping is made. If the receiver fails to receive the proper framing code at the proper time, it sends an alarm to its distant transmitter to cause the transmitter to send a special code of ternary pulses having a large number of three zeros in sequence. At the receiver, the ternary pulses are grouped in groups of three, and if three zeros appear in a group, the grouping is shifted by one ternary pulse. If three zeros subsequently appear in a group, the grouping is again shifted by one ternary pulse. After two such shifts, the grouping must be correct, and the proper ternary-to-binary conversion can then be made. After conversion from ternary pulses to binary pulses, the binary pulses can be decoded and demultiplexed. If the receiver is in frame as it should be, then the framing code will be received at the proper time. The synchronization or the proper grouping of the receiver ternary pulses can, in accordance with my invention, be quickly made (in approximately 70 microseconds) following the first detection of a grouping of three ternary zeros.

BRIEF DESCRIPTION OF THE DRAWING

The subject matter which I regard as my invention is particularly pointed out and distinctly claimed in the Claims. The structure and operation of my invention, together with further objects and advantages, may be better understood from the following description, given in connection with the accompanying drawing, in which:

FIG. 3 shows a table of the binary-ternary conversion code used in the system of FIG. 1;

DESCRIPTION OF THE PREFERRED EMBODIMENT

Figure 1:
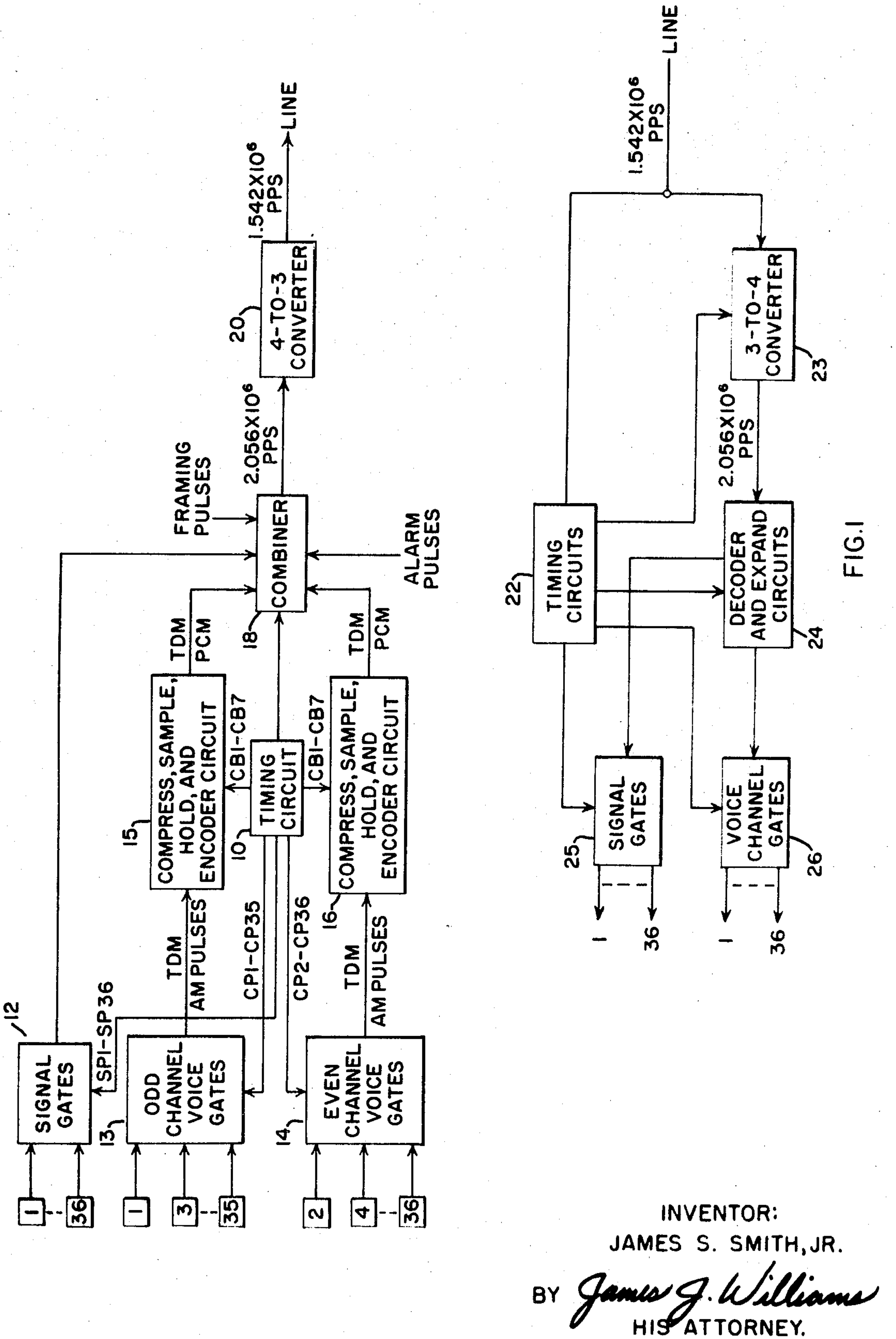
FIG. 1 shows a general block diagram of a time-division multiplex, pulse-code modulation transmitter and receiver in a TCS–27 system, and for which I provide my synchronizing system.

In the following description, I will first give a general description of the TCS–27 Pulse Code Modulation Carrier System with which my invention is intended to be used; then give a detailed description of my synchronizing system; and finally give a description of the operation of my synchronizing system.

TCS–27 PULSE-CODE MODULATION CARRIER SYSTEM

In the following description of the TCS–27 System, it has been assumed that the system is used with 36 voice channels. However, it is to be understood that almost any type of information can be transmitted by the 36 channels. Since a typical voice channel for telephone use has an upper frequency limit of about 4,000 Hertz, an amplitude-sampling rate of twice this, or 8,000 Hertz or pulses per second, has been selected in accordance with good engineering practice. Such a sampling rate ensures reasonably good fidelity and quality for ordinary telephone conversations. The TCS–27 System provides 36 voice channels, and one signalling, alarm, and framing channel. In order that each voice channel amplitude sample can be adequately represented, 128 different quantizing steps or amplitude levels are recognized. In binary codes, these 128 different amplitude levels require seven digits or bits. The first bit is the most significant, and represents an amplitude level of 64. The second through the sixth bits respectively represent amplitude levels of 32, 16, 8, 4, and 2. The seventh bit is the least significant, and represents an amplitude level of 1. The 37th channel for signalling, alarm, and framing, comprises 5 bits. Under these specifications, 8,000 samples/channel-second, multiplied by seven bits/sample, multiplied by 36 channels (which represent 2,016,000 pulses or bits per second) plus 8,000 samples/channel-second, multiplied by five bits/sample, multiplied by 1 channel (which represent 40,000 pulses or bits per second) are required. This represents a total of 2.056 million pulses per second. Hence, the required basic clock or pulse-rate frequency is 2.056 million pulses per second.

As shown in FIG. 1, the TCS–27 System has a timing circuit 10 which supplies the basic clock or pulse frequency of 2.056 million pulses per second. In addition, the timing circuit 10 supplies other timed signals, including the following:

Signalling pulses SP1 through SP36 for operating the 36 signal gates 12

Channel pulses CP1 through CP36 for operating the odd and even channel voice gates 13, 14

Framing pulses FP1 through FP12 for indicating each of the 12 frames of a super frame Channel bits CB1 through CB7 for indicating each of the 7 bits which encode the voice channels or each of the 5 bits which encode the signalling, alarm, and framing channel.

Signalling, such as dialing or other information, is applied to the signal gates 12, and is gated through at an appropriate time by the signal pulses SP1 through SP36 to a combiner 18 for multiplexing. Since a relatively long time is required to encode each of the voice channels, two voice gates 13, 14, are used, these being respectively designated the odd-channel voice gates 13 and the even-channel voice gates 14. These gates 13, 14 repetitively sample the information (amplitude) of the voice channels in sequence (1, 3, 5, etc. and 2, 4, 6, etc., respectively), each channel being sampled 8,000 times per second. The odd channels 1 through 35 are gated by the odd channel pulses CP1 through CP35 and the odd-channel voice gates 13 to an odd compress, sample, hold, and encoder circuit 15. In a similar manner, the even channels 2 through 36 are gated by the even channel pulses CP2 through CP36 and the even-channel voice gates 14 to an even compress, sample, hold, and encoder circuit 16. The signals applied to the circuits 15, 16 are time-division multiplex, amplitude-modulation pulses. In the circuits 15, 16, these pulses are compressed in accordance with conventional practice, to amplify or emphasize the lower signal amplitudes more than the higher signal amplitudes. However, it should be pointed out that such compression may be omitted. Each of the pulses is amplitude-sampled again, preferably at the end or during the last part of its respective first sample. Each of these second amplitude samples is held in a suitable time-delay circuit, and then encoded or quantized. That is, the amplitude of the held sample is measured or compared with respect to a reference level, and this measured level is then indicated by the 7 binary bits. For example, if the encoder recognizes 128 different amplitude levels (between 0 and 127), and if a held pulse has a measured level of 93 for example, this held pulse would be encoded as: 1 0 1 1 1 0 1. In this code, the first (and most significant) bit is a 1 which represents 64. The second bit is a 0 which represents the absence of 32. The third bit is a 1 which represents 16. The fourth bit is a 1 which represents 8. The fifth bit is a 1 which represents 4. The sixth bit is a 0 which represents the absence of 2. And the seventh (and least significant) bit is a 1 which represents 1. The numbers represented by a 1 total 93. The combiner 18, utilizing various timed signals from the timing circuit 10, combines these time-division multiplexed, encoded bits in the proper sequence beginning with Channel 1, and ending with Channel 36. After the Channel 36 coded pulses, five bits or pulses (representing signalling and alarm or framing) are then combined to provide a frame of 257 bits or pulses. This frame is repeated 8,000 times per second so that 257 multiplied by 8,000 or 2.056 million pulses per second are produced by the combiner 18. These pulses are then applied to a 4-to- 3 converter 20 which converts the coded binary pulses having two levels (namely a 0 or 1) to coded ternary pulses having three levels (namely plus, zero, and minus). In this conversion, each successive group of four binary pulses is converted to three ternary pulses. Thus, the frequency of the ternary pulses is three-fourths the frequency of the binary pulses, or 1.542 million pulses per second. These ternary pulses are applied to the circuit or line, which typically comprises a pair of wires in a cable.

At the receiver, the ternary pulses are derived from a circuit or line and applied to timing circuits 22 which reproduce the basic pulse or clock frequency of 2.056 million pulses per second as well as other timing signals for use by various parts of the receiver. The incoming ternary pulses (at a rate of 1.542 million pulses per second) are also applied to a 3-to-4 converter 23 which converts the ternary pulses back to corresponding binary pulses. In this conversion, each successive group of three ternary pulses is converted to four binary pulses. This grouping must be synchronized with or must correspond to the grouping used at the distant transmitter in order to provide proper decoding. As will be subsequently explained, my invention provides this proper grouping. These binary pulses, which have a rate of 2.056 million pulses per second, are applied to decoder and expand circuits 24 which convert successive groups of seven binary pulses back to audio signals corresponding to the audio signals at the transmitter, and which expand the converted signals to compensate for the compression that took place at the transmitter. These expanded audio signals are then applied to voice channel gates 26 which, with signals from the timing circuits 22, demultiplex the audio signals back to their respective voice channels 1 through 36. The binary pulses of Channel 37 are supplied by the converter 23 to signal gates 25 which, with signals from the timing circuits 22, provide signals for the respective voice channels 1 through 36. FIG. 1 shows the transmitter and receiver for only one terminal. Persons skilled in the art will appreciate that the transmitter of FIG. 1 would be used with a distant receiver, and that the receiver of FIG. 1 would be used with a distant transmitter. The distant transmitter and receiver would be respectively connected to the receiver and transmitter of FIG. 1 by two separate communication links, such as two pairs of wires.

Figure 2:
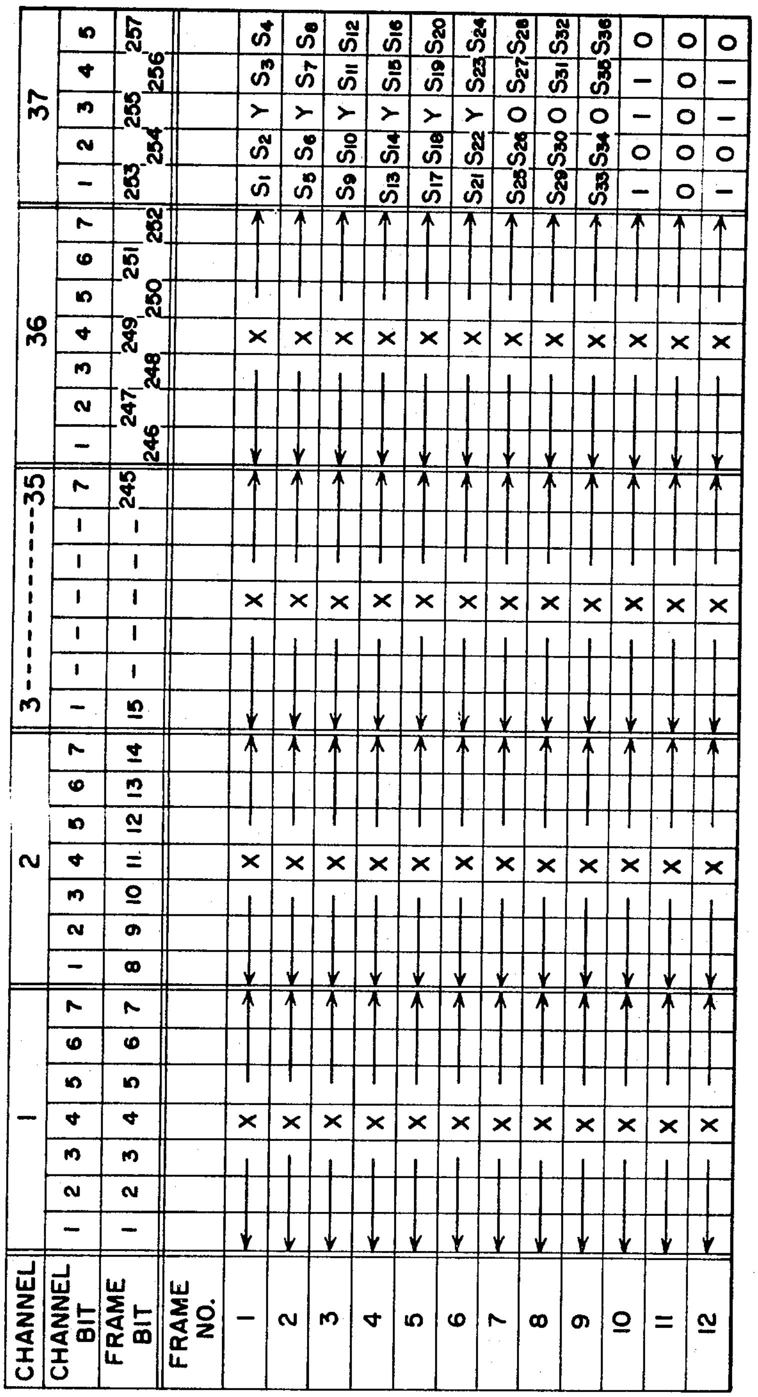
FIG. 2 shows a table giving the makeup of the channels in each of the 12 frames forming a super frame in the system of FIG. 1.

FIG. 2 shows a table giving the makeup of the 37 channels in each of the 12 frames forming a super frame. In the top horizontal line, channels 1 through 37 are indicated. Since the makeup of the voice channels is the same, channels 3 through 35 are not shown in detail, as indicated by the dashed line. In the next horizontal line, the seven digits or bits needed to encode the sampled amplitude are indicated. It will be noted that each of the voice or information channels 1 through 36 comprises seven such digits or bits. The 37th channel ( for signalling, alarm, and framing) comprises only five digits or bits. In the third horizontal line, the frame bit numbers are indicated for the channels. It should be noted that each frame comprises 257 bits; bits 1 through 252 are for the 36 voice channels, and bits 253 through 257 are for the signalling, alarm, and framing channel 37. Below the third line in the left-hand column, the frame numbers 1 through 12 are indicated. In the vertical columns under the voice channels, the bits are marked by an "X" which indicates that the bits may be either a 1 or a 0 in whatever combination is needed to encode amplitude levels 0 through 127. As will be explained in more detail subsequently, all 36 channels may have a 1 followed by six 0's in all 12 frames to provide synchronizing or grouping in accordance with my invention. Channel 37 has a different makeup. Channel bit 3 of Channel 37 or frame bit 255 is marked by a "Y" for the first six frames. This "Y" is a 0 when the system is in frame, but is a 1 when the system is out of frame. Channel bit 3 of Channel 37 (frame bit 255) of frames 7, 8, and 9 is preferably always 0. Channel bits 1, 2, 4, and 5 of Channel 37 (frame bits 253, 254, 256, 257) of the first nine frames respectively indicate the signalling information for the 36 channels as indicated by the designation S1 through S36. These bits are either a 1 to indicate a signal, or a 0 to indicate no signal. Generally, only one bit per channel per super frame is needed in order to provide the necessary signalling, since a super frame is repeated every 1.5 milliseconds. This is shown by the following calculation:

$$\frac{275 \text{ pulses/frame} \times 12 \text{ frames/super frame}}{2{,}056{,}000 \text{ pulses/second}} = 1.5 \text{ milliseconds/super frame}$$

In frames 10, 11, and 12, bits 1 through 5 of Channel 37 or frame bits 253 through 257 are used for system framing. These bits may have various logic sequences, but a preferred sequence is given in FIG. 2. The receiver is arranged with logic circuits so that if the selected framing logic sequence is not received in frames 10, 11, and 12 of Channel 37, the receiver causes its local transmitter to send an alarm. This alarm is indicated by a 1 at the bits marked with a "Y" in FIG. 2. This 1 is sent to the distant terminal to cause the distant transmitter to send the distinguishing code of 1 0 0 0 0 0 0 continuously in all 36 voice channels. The framing code used in Channel 37, frames 10, 11, and 12, is therefore readily distinguishable from the voice channels, so that synchronization, including proper grouping, can be quickly achieved. Provision of a separate Channel 37 for signalling, alarm, and framing is an important feature in that it permits the 36 voice channels to have only voice information, and hence provides a high quality system of 36 voice channels with a line rate of 1.542 million pulses per second.

FIG. 3 shows the binary-ternary conversion code which is used. This code is used in the 4-to-3 converter 20 of the transmitter to convert binary bits or pulses to ternary bits or pulses; and is used in the 3-to-4 converter 23 in the receiver to convert ternary pulses back to binary pulses. As explained earlier, the pulses supplied by the combiner 18 in the transmitter are a stream of binary pulses having a rate of 2.056 million pulses per second. These binary pulses are placed in groups of four pulses, and each group of four binary pulses is converted to a corresponding group of three ternary pulses so that the line frequency is reduced. At the receiver, the ternary pulses are placed in the same corresponding groups of three, and each group of three ternary pulses is converted back to binary pulses in the same corresponding groups of four. It is, of course, very important that the proper grouping be made so that correct decoding is provided. Otherwise, the information will be lost. In FIG. 3, the first vertical column shows binary groups of four pulses in all 16 possible combinations between four 0's and four 1's. In the next two vertical columns, the corresponding ternary groups of three pulses are shown. These next two columns show a positive mode and a negative mode, since it is desirable that the net polarity weight (i.e., positive and negative), remain as near zero as possible. This is to insure that any transformers in the communication link have as little direct current as possible applied to them. The positive mode is used if the prior net polarity weight is negative, and the negative mode is used if the prior net polarity weight is zero or positive. For example, a binary group of four 0's is converted to a ternary group of 0 + 0 in the positive mode, or 0 − 0 in the negative mode, depending upon what the net polarity weight was just prior to the appearance of that binary group of four 0's. If the prior net polarity weight was negative, then the positive ternary mode of 0 + 0 would be used. If the prior net polarity weight was zero or positive, then the negative ternary mode of 0 − 0 would be used. The last vertical column shows the net polarity weight provided by each of the ternary groups. Thus, for the binary group of four 0's, the ternary group has a polarity weight of 1 ( either a plus or a minus, depending upon which mode is selected). At the receiver, the ternary groups are converted back to their corresponding binary groups as also indicated in FIG. 3. From FIG. 3, it will be seen that proper synchronization and grouping of the ternary pulses at the receiver are absolutely essential in order to get accurate ( or any) information after decoding.

Figure 4:
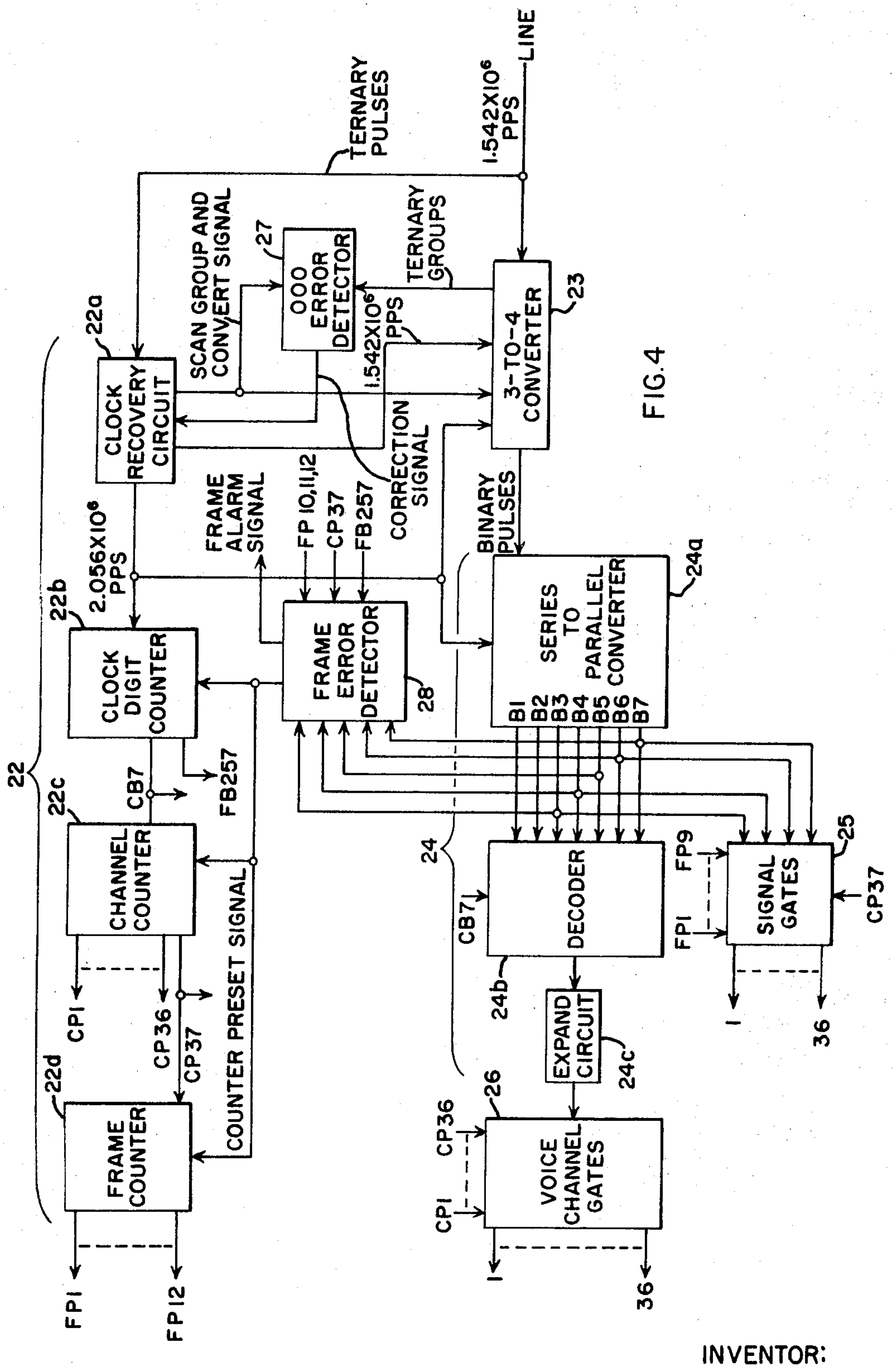
FIG. 4 shows a more detailed block diagram of the time-division multiplex, pulse-code modulation receiver of FIG. 1.

FIG. 4 shows a more detailed block diagram of the TCS–27 system time-division multiplex, pulse-code modulation receiver for receiving, decoding, and demultiplexing signals from a transmitter such as shown in FIG. 1. In FIG. 4, the blocks corresponding to those shown in FIG. 1 have the same reference numerals. The incoming ternary pulses, at a rate of 1.542 million pulses per second, are applied to the timing circuits 22 and the 3-to-4 converter 23. The timing circuits 22 actually comprise four separate or distinct circuits. The first circuit is a clock recovery circuit **22*a* which regenerates stable pulse trains of 1.542, 3.084, 6.168, and 2.056 million pulses per second ( hereinafter sometimes referred to as 1.542, 3.084 6.168, and 2.056 pulses) from the incoming ternary pulses. The 2.056 pulses are applied to a clock digit counter 22*b* which counts these pulses in sequence, and produces timing channel bit CB–7 to represent each seventh channel bit, and produces timing frame bit FB–257 to represent each 257th frame bit. The timing channel bit CB–7 is applied to a channel counter 22*c* which counts the bits CB–7 and produces channel pulses CP–1 through CP–37 in sequence. Each channel pulse CP–37 is applied to a frame counter 22*d* which produces frame pulses FP–1 through FP–12 in sequence and with a duration of 257 frame bits to correspond with the frame times shown in FIG. 2. Thus, the timing circuits 22 produce all of the needed timing signals from the incoming ternary pulses. The incoming ternary pulses are also applied to the 3-to-4 converter 23. The converter 23 groups the pulses in the proper groups of three (i.e., as grouped at the distant transmitter), and in response to a scan group and convert signal along with the 1.542 and 2.056 clock pulses and logic circuits, converts each of these ternary groups to a group of four sequential binary pulses in accordance with the code in FIG. 3. In accordance with my invention, the proper grouping of the ternary pulses is provided by a 000 error detector 27 which scans each group of ternary pulses in response to the scan group and convert signal from the clock recovery circuit 22*a*. As shown in FIG. 3, the ternary codes which are used do not have three consecutive zeros. If three zeros are detected in a group, the detector 27 provides a correction signal that causes the clock recovery circuit 22*a* to skip one clock count, which in turn causes the 3-to-4 data converter 23** to shift the grouping by one ternary pulse. If a ternary group of three zeros is again detected, another correction or shift is made. Since the ternary groups contain only three pulses, a maximum of two corrections or shifts is required, and one correction may provide the correct grouping. Three consecutive zeros were omitted from the ternary code for several reasons, namely the fact that unlimited sequences of zeros make it relatively difficult to reconstruct the clock signals, and the fact that three consecutive zeros can be used to indicate an error.

The binary pulses from the converter 23 are applied to the decoder and expand circuits 24, which actually include three circuits. The first is a series to parallel converter **24*a* which receives binary pulses in sequence and places them in a 7-bit shift register. The seven bits are indicated as B–1 through B–7 and at the appropriate time, all seven bits are simultaneously but separately shifted into a decoder 24b by the channel bit CB–7. After each seven bits B–1 through B–7 are shifted out of the converter 24*a*, more binary pulses are sequentially applied to the shift register in the converter 24*a*. The seven bits simultaneously applied to the decoder 24*b* will, if the receiver is in frame or synchronization, have the same binary makeup as the corresponding seven pulses which encoded an amplitude pulse. These seven bits are converted to a single signal whose amplitude corresponds to the binary makeup of the seven bits. This single signal is then applied to an expand circuit 24*c*. The expand circuit 24*c* decreases the gain of the lower amplitude signals (by the same amount that the gain was increased by the transmitter compressor) so as to faithfully reconstruct the original voice signal. These voice signals are then applied to the voice channel gates 26, which, in response to the channel pulses CP–1 through CP–36, respectively gate the voice signals to the respective channels 1 through 36. The gates 26** may include hold circuits for each channel to provide a continuous voice signal from each gated signal until the succeeding gated signal is supplied (125 microseconds later).

Bits B–3 through B–7 (corresponding to the five channel bits CB–1 through CB–5 in Channel 37) are also applied to a frame error detector 28. The frame error detector 28 compares these five bits or digits in frames 10, 11, and 12 during the time of Channel 37, and if the binary sequence of 1 0 1 1 0 does not appear in Channel 37 of frame 10, or if the binary sequence of 0 0 0 0 0 does not appear in Channel 37 of frame 11, or if the binary sequence of 1 0 1 1 0 does not appear in Channel 37 of frame 12, the error detector 28 produces a counter preset signal which causes the clock digit counter 22*b*, the channel counter 22*c*, and the frame counter 22*d* to correct their count until these three binary sequences do appear in Channel 37 of frames 10, 11, and 12. A random or one-time error in transmission of the binary framing sequence is ignored by the error detector 28.

Signalling information is derived from bits B–3, B–4, B–6, and B–7 (corresponding to channel bits CB–1, CB–2, CB–4, and CB–5) during Channel 37 of frames 1 through 9, and this information is applied to the signal gates 25. The signal gates 25 supply this information to the proper channels 1 through 36 at times directed by frame pulses FP–1 through FP–9, and by channel pulse CP–37. As mentioned earlier, only one signalling pulse is provided for each channel during a super frame, but this is sufficient, since one super frame occurs during each 1.5 millisecond. This is ample for signalling, as typical telephone dialing signals last on the order of 40 milliseconds or longer.

SYNCHRONIZING SYSTEM - DESCRIPTION

Figure 5:
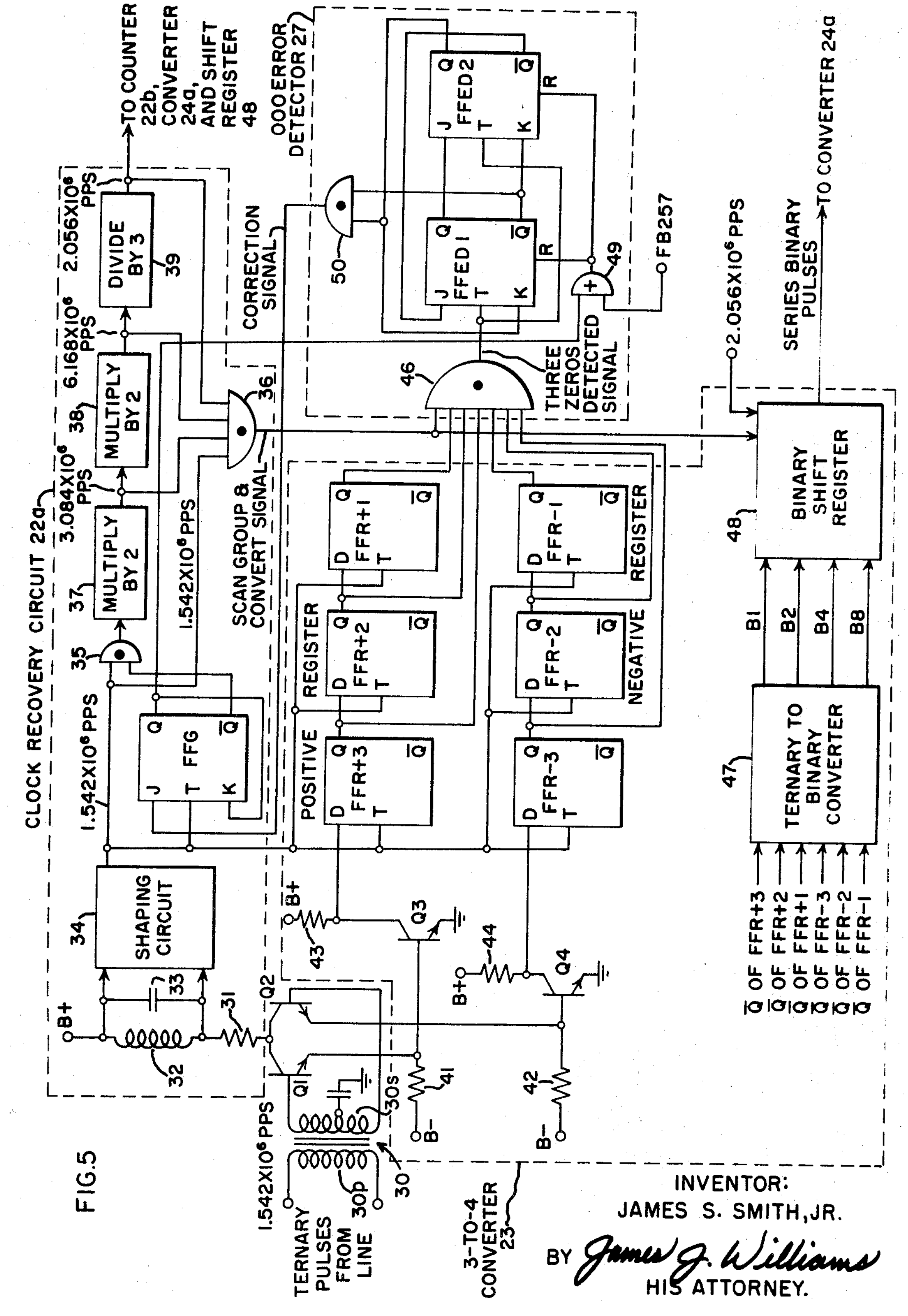
FIG. 5 shows a more detailed diagram of the synchronizing system in accordance with our invention.

The synchronizing system in accordance with my invention is shown in more detail in the diagram of FIG. 5. In FIG. 5, I have shown circuit elements comparable to the blocks of FIG. 4 enclosed in dashed lines and given the same reference numbers. These circuit elements include the clock recovery circuit 22*a*; the 3-to-4 converter 23; and the 000 error detector 27. The 1.542 ternary pulses (as mentioned, the million pulses per second is omitted for ease of description) from the line are applied to the primary winding 30*p* of a transformer 30. The secondary winding 30*s* of the transformer 30 is center-tapped to ground, and its two outer leads are respectively connected to the bases of two NPN-type transistors Q1, Q2. The collectors of the transistors Q1, Q2 are joined and connected through a resistor 31 and an inductor 32 to a source of positive direct current voltage B+. The inductor 32 is connected in parallel with a capacitor 33 to resonate at 1.542 million pulses per second, and this resonant circuit is connected to a shaping circuit 34. The shaping circuit 34 amplifies and clips the incoming 1.542 pulses to provide square waves at the 1.542 pulse rate for use in various parts of my synchronizing system. The 1.542 pulses are applied to one input of a two-input AND gate 35, to the trigger input T of a gating flip-flop FFG, to one input of a four-input AND gate 36, and also to the 3-to-4 converter 23. When, as is normally the case, the AND gate 35 passes signals or is open, the 1.542 pulses are applied to a multiply-by-2 circuit 37 which produces the 3.084 pulses. These 3.084 pulses are applied to a second input of the AND gate 36, and to a second multiply-by-2 circuit 38 which produces the 6.168 pulses. These 6.168 pulses are applied to a third input of the AND gate 36 and to a divide-by-3 circuit 39. The circuit 39 divides its input pulses by three and produces the 2.056 pulses. This frequency (2.056 million pulses per second) corresponds to the original frequency of the binary pulses at the transmitter, and is used in various parts of the receiver as shown in FIG. 4. These 2.056 pulses are also applied to a fourth input of the AND gate 36. As known in the art, an AND gate requires all its inputs to be at a certain logic level (which I have designated a logic 1 in this application) to produce an output of the same logic level (namely a 1). Thus, the AND gate 36 produces the scan group and convert signal when all four of its inputs (derived from the 1.542, the 3.084, the 6.168, and the 2.056 pulses) are at a logic 1. The gating flip-flop FFG in the clock-recovery circuit 22*a* is a JK-type flip-flop having a set steering input J, a trigger input T, a reset steering input K, and Q and $\overline{Q}$ outputs. As known to persons skilled in the art, the JK flip-flop responds to trigger pulses and steering in accordance with the following table:

TABLE 1

| J | K | Q | $\overline{Q}$ | FF Status |
|---|---|---|---|---|
| 0 | 0 | Remain Unchanged | | – |
| 0 | 1 | 0 | 1 | Reset |
| 1 | 0 | 1 | 0 | Set |
| 1 | 1 | Both Switch | | – |

In such a flip-flop, triggering is provided at the trigger input T by a signal that varies from logic 0 to logic 1 and back to logic 0. When the gating flip-flop FFG is reset (its normal condition), its $\overline{Q}$ output is at logic 1 so that the AND gate 35 passes the 1.552 pulses. If the gating flip-flop FFG is set, its $\overline{Q}$ output is at logic 0, so that the gate 35 can not pass the 1.542 pulses.

The emitters of the transistors Q1, Q1 are respectively connected in series or tandem fashion to the bases of two NPN-type transistors Q3, Q4 in the 3-to-4 converter 23. The bases of these transistors Q3, Q4 are biased to a normally nonconducting condition by respective resistors 41, 42 which are connected to a source of negative direct current voltage B–. The emitters of the transistors Q3, Q4 are connected to ground, and the collectors of the transistors Q3, Q4 are connected through respective resistors 43, 44 to a source of positive direct current voltage B+. The circuit including the transistors Q3, Q4 is a polarity-sensitive circuit and is able to sense whether the incoming ternary pulses are positive, negative, or zero. If a received ternary pulse is positive i.e., the upper end of the secondary winding 30*s* of the transformer 30 is positive and the lower end is negative), the transistor Q1 is turned on and the transistor Q2 is turned off. This causes the transistor Q3 to turn on and the transistor Q4 to turn off. The collector voltage of the transistor Q3 approaches zero (logic 0), and the collector voltage of the transistor Q4 becomes positive (logic 1). The converter 26 has six D-type register flip-flops: FFR+3, FFR+2, and FFR+1 in the positive register; and FFR–3, FFR–2, and FFR–1 in the negative register. A D flip-flop responds to logic at the input D and trigger pulses at the trigger input T in accordance with the following table:

TABLE 2

| D | Q | $\overline{Q}$ | FF Status |
|---|---|---|---|
| 1 | 1 | 0 | Set |
| 0 | 0 | 1 | Reset |

The register flip-flops are normally set, a condition which indicates a ternary zero. The positive register flip-flops become reset in response to positive ternary pulses, and the negative register flip-flops become reset in response to negative ternary pulses. Hence, the received positive ternary pulse mentioned above causes the positive register flip-flop FFR+3 to be reset (Q is at 0) and the negative register flip-flop FFR—3 to be set ( Q is at 1). A negative ternary pulse causes the negative register flip-flop FFR—3 to be reset and the positive register flip-flop FFR+3 to be set. A zero ternary pulse causes both flip-flops FFR—3 and FFR+3 to be set. The Q output of the flip-flop FFR+3 is connected to the input D of the flip-flop FFR+2, and the Q output of the flip-flop FFR+2 is connected to the input D of the flip-flop FFR+1. The flip-flops FFR—3, FFR—2, and FFR—1 are similarly connected. Hence, each positive or zero ternary pulse is passed in sequence through the positive register flip-flops FFR+3, FFR+2, and FFR+1; and each negative or zero ternary pulse is passed in sequence through the negative register flip-flops FFR—3, FFR—2, and FFR—1. For example, if three ternary pulses plus, zero, and minus are received in that order, the first pulse (plus) is indicated by the flip-flop FFR+1 being reset and the flip-flop FFR—1 being set; the second pulse (zero) is indicated by both second flip-flops FFR+2 and FFR—2 being set; and the third pulse (minus) is indicated by the flip-flop FFR+3 being set and the flip-flop FFR—3 being reset. If three ternary zeros are received, the positive register flip-flops FFR+3, FFR+2, and FFR+1 are set, and the negative register flip-flops FFR—3, FFR—2, and FFR—1 are also set, resulting in a logic 1 at the Q output of each of the flip-flops. The Q output of each of the six flip-flops is connected to a respective input of a seven-input AND gate 46. The scan group and convert signal from the gate 36 is connected to the seventh input of the AND gate 46. The $\bar{Q}$ outputs of the register flip-flops are applied to a ternary to binary converter 47 which converts the state of the $\bar{Q}$ outputs representing ternary pulses to four corresponding binary pulses in accordance with the code shown in FIG. 3. In response to the scan group and convert signal, the binary pulses ( having weights of 1, 2, 4, and 8) are transferred in parallel to a binary shift register 48 which produces four binary pulses in series at the 2.056 pulse rate. These binary pulses are applied to the converter **24*a*** for decoding, so it will be seen how vital and significant the ternary pulse grouping is to the operation of the TCS–27 System.

The presence of three ternary zeros in a group is indicated by the 000 error detector 27. The error detector 27 utilizes two JK-type flip-flops FFED1 and FFED2, which are interconnected as shown. In addition to operating in accordance with information shown in the Table 1, the flip-flops FFED1 and FFED2 also have a reset input at which a logic 1 can reset the flip-flop without the necessity of a trigger pulse. A reset signal is provided by a two-input OR gate 49. One input of the OR gate 49 is derived from the Q output of the gating flip-flop FFG, and the other input of the OR gate 49 is derived from frame bit FB–257 which is produced by the clock-digit counter **22*b* of FIG. 4. Thus, the flip-flops FFED1 and FFED2 will always be reset at the end of each frame. The $\bar{Q}$ output of the flip-flop FFED1 and the Q output of the flip-flop FFED2 are respectively applied to the two inputs of an AND gate 50. The output of this gate 50 provides a correction signal which is connected to the set steering input J of the gating flip-flop FFG. The error detector flip-flops FFED1 and FFED2 are triggered by a three zeros detected signal. The three zeros detected signal is produced if three ternary zeros are in the converter 23** at the time a scan group and convert signal is produced. With the flip-flops FFED1 and FFED2 initially reset, the three zeros detected signal causes the following operation:

TABLE 3

| | FFED1 | FFED2 |
|---|---|---|
| | Q | Q |
| Reset | 1 | 0 |
| 1st 000 Signal | 0 | 0 |
| 2nd 000 Signal | 0 | 0 |
| 3rd 000 Signal | 1 | 1 |
| Reset | 1 | 0 |

An examination of Table 3 will show that when the flip-flops FFED1 and FFED2 begin in the reset condition, three separate three zeros detected signals are required in order for the $\bar{Q}$ output of the flip-flop FFED1 and the Q output of the flip-flop FFED2 to both be at a logic 1. When this occurs, the AND gate 50 produces a logic 1, which provides set steering to the J input of the gating flip-flop FFG. With set steering, and on the occurrence of the next 1.542 trigger pulse, the gating flip-flop FFG becomes set and its $\bar{Q}$ output provides a logic 0 to the AND gate 35 to block this gate 35 so that no 1.542 pulses can pass. The Q output of the gating flip-flop FFG becomes a logic 1, which is passed by the OR gate 49 to reset the error detector flip-flops FFED1 and FFED2. This same logic 1 is also applied to the reset steering input K of the gating flip-flop FFG so that on the occurrence of the next 1.542 pulse from the shaping circuit 34, the flip-flop FFG returns to its normal reset state. This, then, restores the circuit to its beginning error-detecting position. Thus, it will be seen that the circuit of FIG. 5 requires three ternary zeros to be present in the registers when a scan group and convert signal occurs in order to produce a three zeros detected signal. However, as shown by Table 3, three separate three zeros detected signals must be produced before a correction signal will be provided. If only one or two three zeros detected signals are produced in a frame, the error detector 27 will be reset at the end of the frame by the frame bit FB–257. The requirement of three such signals is to guard against the very small possibility of three zeros being detected in one frame by some unusual or random condition.

SYNCHRONIZING SYSTEM — OPERATION

Figure 6:
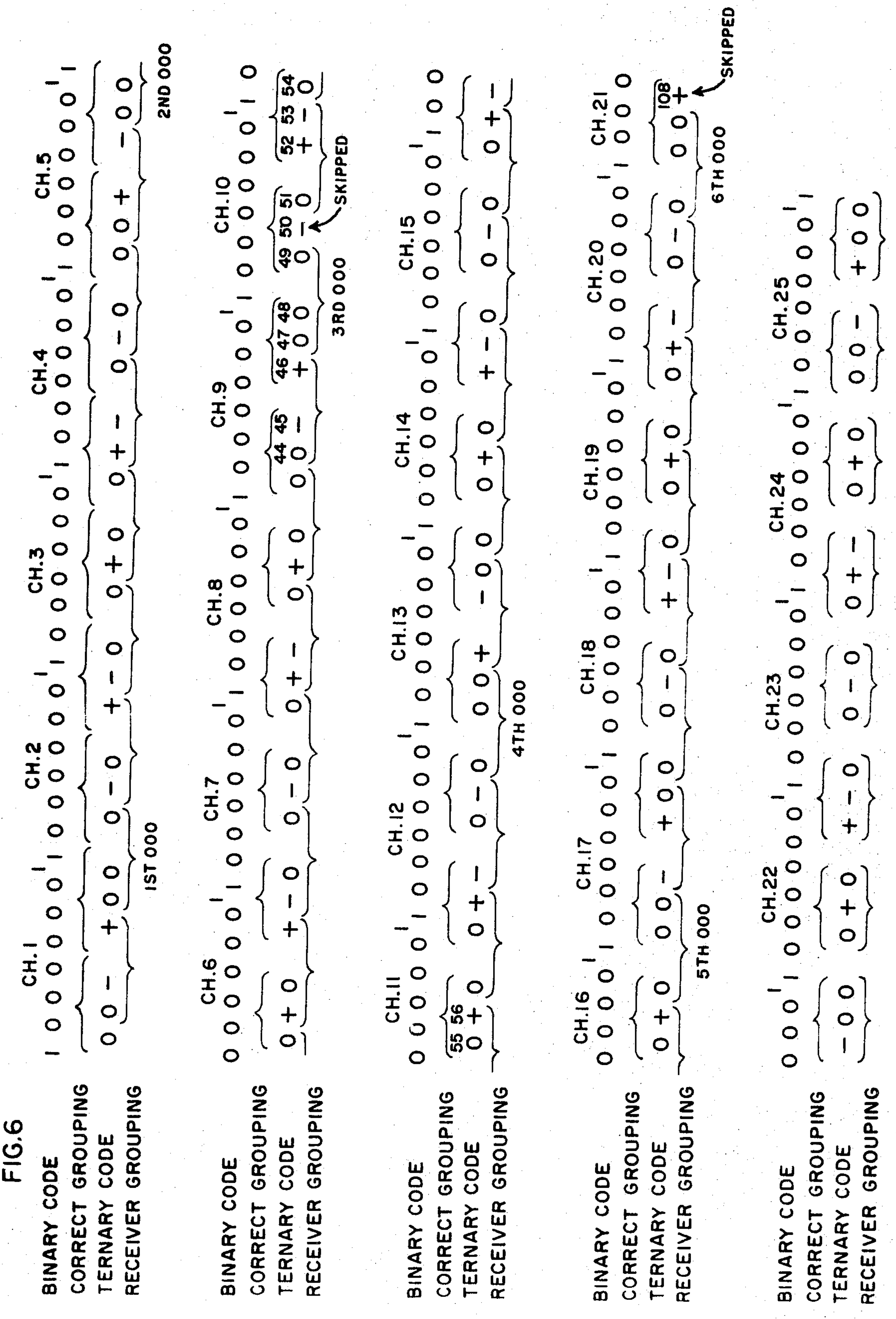
FIG. 6 shows a train of binary and ternary pulses, with various groupings being indicated.

A better understanding of my synchronizing system of FIG. 5 can be gotten from the following explanation of its operation. As a starting point, I have assumed that a distant transmitter is grouping four binary pulses and encoding them in groups of three ternary pulses ( according to FIG. 3), and sending the ternary pulses along a line to a near receiver such as shown in FIG. 4. I have further assumed that at the beginning, the near receiver is or has been out of frame or synchronization for some specified length of time exceeding a random condition. When the near receiver is out of frame, its frame error detector 28 of FIG. 4 does not get or receive the framing pulses 1 0 1 1 0, 0 0 0 0 0, and 1 0 1 1 0, during frames 10, 11 and 12 of Channel 37, as shown on FIG. 2. Under this condition, the frame error detector 28 produces a frame alarm signal which is converted to alarm pulses and applied to the combiner 18 of the transmitter associated with the near receiver. The near combiner 18 sends these alarm pulses (logic 1) during frame bit 255 of frames 1 through 6. When the distant receiver receives these alarm pulses, it recognizes that the receiver at the near end is out of frame or synchronization, and it causes its associated transmitter (at the distant end) to send the seven bit, 64 distinguishing code (1 0 0 0 0 0 0) during each of the 36 channels in all 12 frames of a super frame. The selection of the 64 distinguishing code was based on the fact that when the binary pulses 1 0 0 0 0 0 0 are converted to ternary pulses in accordance with the code of FIG. 3, seventeen sets of three sequential ternary zeros occur in every frame. However, as shown in FIG. 3, if proper grouping of the ternary pulses is provided, no group of ternary pulses will have three zeros. In FIG. 6, we have shown the 64 distinguishing code (1 0 0 0 0 0 0) in the first 25 channels of a frame, since this is a sufficient number to explain the operation. However, this distinguishing code is sent in all 36 channels until grouping and framing are correct. In FIG. 6, the upper 1's and 0's show the 64 distinguishing code in binary form; and the lower +'s, −'s, and 0's show the 64 distinguishing code in ternary form, as supplied by the distant transmitter. The first four binary pulses (1 0 0 0) of Channel 1 are converted to the ternary pulses of 0 0 − . Similar conversions take place for each four binary pulses in accordance with the code of FIG. 3.

Figure 7:
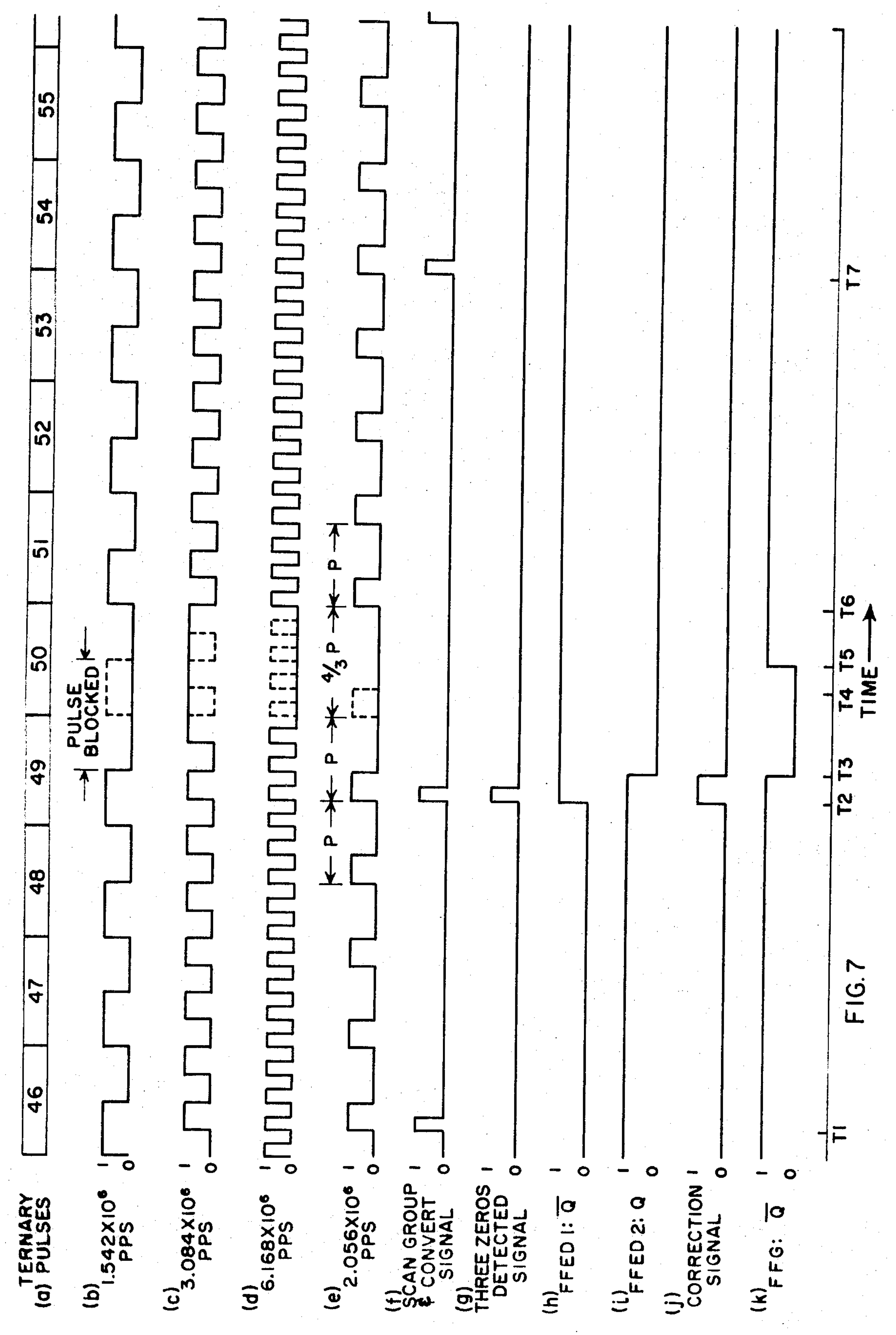
FIG. 7 shows waveforms illustrating, in connection with FIG. 6, the operation of the synchronizing system of FIG. 5 to achieve the correct ternary pulse groupings.

The correct grouping for the receiver is indicated by the upper brackets in FIG. 6. In the receiver that is out of frame, I have assumed that the initial grouping has missed the first ternary pulse, so that the last two ternary pulses of the first (correct) group and the first ternary pulse of the second (correct) group are grouped incorrectly as 0 − + . This, and subsequent incorrect groups are shown by the lower brackets. In the next group, three sequential zeros occur, these being indicated as the first three zeros. When these three zeros occur, the register flip-flops in the 3-to-4 converter 23 all become set to supply logic 1's to the AND gate 46. When a scan group and convert signal is provided by the gate 36, the gate 46 applies a trigger signal to the error-detector flip-flops FFED1 and FFED2 to cause the flip-flops to have the states shown in line 2 of Table 3. Nothing further occurs in the synchronizing circuit until the occurrence of the second group of three zeros (shown in FIG. 6 at the end of channel 5 and at the beginning of channel 6). This second group of three zeros causes the error detector flip-flops FFED1 and FFED2 to have the states shown in line 3 of Table 3. Nothing further occurs until the occurrence of the third group of three zeros at the end of channel 9 and at the beginning of channel 10. At this point, reference should be made to FIG. 7, and particularly FIG. 7(a) which shows the time-occurrence of ternary pulses 46 through 55 (also indicated in FIG. 6). In the waveforms of FIG. 7, circuit time delays have been ignored in order that the circuit operation can be more easily understood. FIGS. 7(b), 7(c), 7(d), and 7(e) respectively show the 1.542, the 3.084, the 6.168 and the 2.056 pulses. At the time T1 during ternary pulse 46, a scan group and convert signal is produced by the AND gate 36 as shown in FIG. 7(f), since all four pulses of FIG. 7(b), 7(c), 7(d), and 7(e) are at a logic 1. However, as shown in FIG. 6, the three ternary pulses 44, 45, and 46, stored in the registers are zero, minus, and plus. Therefore, no three-zeros detected signal is produced. Three ternary pulses later at the time T2, another scan group and convert signal is produced as shown in FIG. 7(f). As shown in FIG. 6, the ternary pulses 47, 48, and 49 stored in the registers are all zero, so that a three zeros detected signal is produced at the time T2 as shown in FIG. 7(g). This signal is passed by the gate 46 and causes the flip-flops FFED1 and FFED2 to have the states shown in line 4 of Table 3. The Q output of the flip-flop FFED2 was already at 1 as shown in FIG. 7(i) and Table 3, and the $\bar{Q}$ output of the flip-flop FFED1 switches to 1 as shown in FIG. 7(h) and Table 3. This condition provides a 1 at both inputs of the AND gate 50 so that a correction signal is produced as shown in FIG. 7(j). This signal provides set steering to the gating flip-flop FFG so that when the next 1.542 pulse goes to 0 at the time T3, the gating flip-flop FFG is triggered and becomes set. Its Q output switches to 1 and its $\bar{Q}$ output switches to 0, as shown in FIG. 7(k). With the $\bar{Q}$ output of the gating flip-flop FFG at 0, the AND gate 35 in the clock recovery circuit 22*a* cannot pass pulses, so that the 1.542 pulse is blocked beginning at the time T3, as indicated in FIG. 7(b).

With the gating flip-flop FFG now set, the 1 at its Q output is passed by the OR gate 49 in the error detector 27 to provide a reset signal to both error detector flip-flops FFED1 and FFED2. The flip-flop FFED1 was previously reset at the time T2, but the flip-flop FFED2 was set by the second three zeros signal. Hence, the Q output of the flip-flop FFED2 returns to 0 as indicated in FIG. 7 (i) at the time T3. This ends the correction signal as shown in FIG. 7(j). However, the gating flip-flop FFG remains set until its next trigger pulse (which is never blocked) goes to zero at the time T5. The gating flip-flop FFG is then reset because its Q output is at 1, and this provides reset steering at the reset steering input K. Thus, at the time T5 (and following three separate three zero signals), the gate 35 is again opened to pass 1.542 pulses, and the error detector flip-flops FFED1 and FFED2 and the gating flip-flop FFG are reset to await more three zero signals.

During the interval between the times T3 and T5 when the gate 35 is closed so that one 1.542 pulse is blocked, there is no pulse applied to the multiply-by-2 circuits 37, 38 and the divide-by-3 circuit 39. Thus, two 3.084 pulses are blocked, four 6.168 pulses are blocked, and one and one-third 2.056 pulses are blocked. The blocked pulses are indicated by the dotted lines of FIG. 7(c), 7(d), and 7(e). In connection with the 2.056 pulse, 1 and ⅓ (or 4/3) of this pulse is blocked, since the ratio of the 1.542 pulse period to the 2.056 pulse period is 4/3. This is shown by the time period P in FIG. 7(e), where it will be seen that the 2.056 pulse is blocked for 4/3 P. The blocked pulse would have occurred just prior to the time T4, but the blocking is extended for one-third more of the period P, so that normal operation of the divide-by-3 circuit 39 does not begin until the time T6.

With pulses being blocked for the interval 4/3 P, it will be seen that the next ternary pulse 50 is, in effect, skipped or omitted in the next group. Thus, the next group is shifted or delayed by one ternary pulse, and begins with the next ternary pulse 51. This is shown more clearly in FIG. 6 where, after the third set of three zeros, the grouping skips ternary pulse 50 and includes the next three ternary pulses 51, 52, 53, and the next three pulses 54, 55, and 56, and so on. In FIG. 7(f), it will be seen that the next scan group and count signal is provided at the time T7 during ternary pulse 53. Thus, after the detection of three sets of three zeros, one ternary pulse is skipped in the grouping, and the grouping again continues. If, as is quite possible, this is the same grouping as utilized at the distant transmitter, no further synchronization or proper grouping of the ternary pulses is required. However, I have assumed the worst condition where two shifts of the grouping are required. This is shown in FIG. 6 where the fourth set of three zeros is detected between channels 12 and 13, the fifth set of three zeros is detected between channels 16 and 17, and the sixth set of three zeros is detected between channels 20 and 21. This fourth, fifth, and sixth set of three zeros provides the same function of the error detector 27 as described for the first three sets of three zeros. After the sixth set of three zeros, ternary pulse 108 associated with channel 21 will be skipped. With pulse 108 being skipped, the grouping thus provided is as shown at the bottom of FIG. 6, and it will be seen that this is the correct grouping. With the correct grouping, the scan group and convert signal occurs at the proper time so that the three correct ternary pulses are converted to binary pulses by the converter 23, which is also operated by the scan group and convert signal. Thus, for the worst condition, groupings can be provided in approximately 21 of the voice channels, which requires a time period of approximately 108 ternary pulses. The ternary pulses have a frequency of 1.542 million pulses per second, so that this requires approximately 70 microseconds to achieve proper grouping of the ternary pulses. Once the ternary pulses are grouped properly, the frame error detector 28 of FIG. 4 can then preset the digit counter **22*b*, the channel counter 22*c*, and the frame counter 22*d* to cause these counters to provide the proper framing in accordance with the unique framing code which is supplied during channel 37 in frames 10, 11 and 12. Once this occurs, the frame error detector removes the frame alarm signal, and frame bit 255 in frames 1 through 6** returns to a zero. When the distant receiver receives this zero, it permits its associated transmitter to terminate the 64 distinguishing code and resume sending information in the channels 1 through 36.

CONCLUSION

It will thus be seen that I provide a new and improved synchronizing circuit for properly grouping ternary pulses at a receiver in accordance with or to correspond with the grouping of the pulses at a distant transmitter. While I have shown only one specific embodiment of our synchronizing circuit, persons skilled in the art will appreciate that modifications may be made. For example, various logic circuits may be provided in my circuit of FIG. 5 to achieve the same results. More or less sets of three zeros may be required in order to provide a skip of one ternary pulse. For example, if transmission conditions indicate that three zeros never occur during normal conversation, then a single set of three zeros could be used to cause skipping of a ternary pulse. If the grouping is not correct after this, the very next set of three zeros can be used to cause another ternary pulse to be skipped, after which the grouping will be correct and in correspondence with the transmission grouping. Likewise, the frame bit FB–257 may be omitted, so that the error detector flip-flops FFED1 and FFED2 are not reset at the end of each frame. Likewise, the frame bit FB–257 may be omitted (so that the error detector flip-flops FFED1 and FFED2 are not reset at the end of each frame), or replaced with any periodic reset signal having the appropriate time interval. This is a matter of preference or choice. And, finally, other combinations of ternary pulses can be used to indicate improper grouping, although we prefer three zeros. Therefore, while my invention has been described with reference to a particular embodiment, it is to be understood that modifications may be made without departing from the spirit of the invention or from the scope of the claims.

What I claim as new and desire to secure by Letters Patent of the United States is:

1. In a time-division multiplex, pulse-code modulation carrier system wherein groups of a selected number of binary pulses are converted in accordance with a selected code by a transmitter to groups of a selected number of sequential ternary pulses for transmission, and wherein received ternary pulses are converted in accordance with said selected code by a receiver to binary pulses for decoding and demultiplexing, a system for a receiver for synchronizing the grouping of said ternary pulses for conversion to binary pulses to correspond with the grouping of said pulses at said transmitter, said synchronizing system comprising:

a. converter means for grouping each sequence of said selected number of receiver ternary pulses in a group;

b. means connected to said converter means for scanning the ternary pulses in each of said groups and for producing a signal in response to the presence of a selected combination of scanned ternary pulses in each of said scanned groups;

c. and means connected to said scanning means and to said converter means for shifting the grouping of said ternary pulses in response to said selected combination signal.

2. The synchronizing system of claim 1 wherein said selected number of binary pulses comprises four, and said selected number of ternary pulses comprises three.

3. The synchronizing system of claim 1 wherein said shifting means shifts the grouping of said ternary pulses by one ternary pulse.

4. The synchronizing system of claim 1 wherein said shifting means require at least two of said selected combination signals.

5. The synchronizing system of claim 1 wherein said selected number of binary pulses comprises four, said selected number of ternary pulses comprises three, and said shifting means shifts the grouping of said ternary pulses by one ternary pulse.

6. The synchronizing system of claim 1 wherein said selected number of binary pulses comprises four, said selected number of ternary pulses comprises three, and said shifting means require at least two of said selected combination signals.

7. The synchronizing system of claim 1 wherein said selected number of binary pulses comprises four, said selected number of ternary pulses comprises three, said shifting means shifts the grouping of said ternary pulses by one ternary pulse, and said shifting means require at least two of said selected combination signals.

8. The synchronizing system of claim 1 wherein said selected number of binary pulses comprises four, said selected number of ternary pulses comprises three, said shifting means shifts the grouping of said ternary pulses by one ternary pulse, said shifting means require at least two of said selected combination signals, and said selected combination comprises three ternary zeros.

9. The synchronizing system of claim 1 wherein said selected number of binary pulses comprises four, said selected number of ternary pulses comprises three, said scanning means and said shifting means have a pulse generator for operating said scanning means at selected intervals, and said shifting means blocks said pulse generator in response to said selected combination signal to cause said shifting.

10. The synchronizing system of claim 1 wherein said selected number of binary pulses comprises four, said selected number of ternary pulses comprises three, said scanning means and said shifting means have a pulse generator for operating said scanning means at selected intervals, and said shifting means blocks said pulse generator for one ternary pulse in response to said selected combination signal to cause said shifting.

11. The synchronizing system of claim 1 wherein said selected number of binary pulses comprises four, said selected number of ternary pulses comprises three, said scanning means and said shifting means have a pulse generator for operating said scanning means at selected intervals, and said shifting means blocks said pulse generator in response to at least two of said selected combination signals to cause said shifting.

12. The synchronizing system of claim 1 wherein said selected number of binary pulses comprises four, said selected number of ternary pulses comprises three, said scanning means and said shifting means have a pulse generator for operating said scanning means at selected intervals, and said shifting means blocks said pulse generator for one ternary pulse in response to at least two of said selected combination signals to cause said shifting.

13. The synchronizing system of claim 1 wherein said selected number of binary pulses comprises four, said selected number of ternary pulses comprises three, said scanning means and said shifting means have a pulse generator for operating said scanning means at selected intervals, said shifting means blocks said pulse generator for one ternary pulse in response to at least two of said selected combination signals to cause said shifting, and said selected combination comprises three ternary zeros.

14. The synchronizing system of claim 1 wherein said shifting means require a plurality of said selected combination signals for shifting said grouping, and further comprising means for restoring said shifting means to an original condition in the absence of said plurality of said selected combination signals occurring within a selected time interval, so as to avoid shifting because of random conditions.

15. The synchronizing system of claim 14 wherein said selected number of binary pulses comprises four, and said selected number of ternary pulses comprises three.

16. The synchronizing system of claim 14 wherein said shifting means shifts the grouping of said ternary pulses by one ternary pulse.

17. The synchronizing system of claim 14 wherein said selected number of binary pulses comprises four, said selected number of ternary pulses comprises three, and said shifting means shifts the grouping of said ternary pulses by one ternary pulse.

* * * * *